US012672012B2

(12) United States Patent
Li et al.

(10) Patent No.: US 12,672,012 B2
(45) Date of Patent: Jun. 30, 2026

(54) ENHANCED COLLABORATION BETWEEN USER EQUIPMENT AND NETWORK TO FACILITATE MACHINE LEARNING

(71) Applicant: INTEL CORPORATION, Santa Clara, CA (US)

(72) Inventors: Ziyi Li, Beijing (CN); Dawei Ying, Portland, OR (US); Qian Li, Portland, OR (US); Zongrui Ding, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 293 days.

(21) Appl. No.: 18/552,641

(22) PCT Filed: Apr. 29, 2022

(86) PCT No.: PCT/US2022/027141
§ 371 (c)(1),
(2) Date: Sep. 26, 2023

(87) PCT Pub. No.: WO2022/235525
PCT Pub. Date: Nov. 10, 2022

(65) Prior Publication Data
US 2024/0349082 A1     Oct. 17, 2024

(30) Foreign Application Priority Data
May 2, 2021     (WO) ................ PCT/CN2021/091798

(51) Int. Cl.
*H04W 24/02*      (2009.01)
*H04W 60/04*      (2009.01)
*H04W 36/00*      (2009.01)
(52) U.S. Cl.
CPC ........... *H04W 24/02* (2013.01); *H04W 60/04* (2013.01); *H04W 36/0083* (2013.01)

(58) Field of Classification Search
CPC . H04W 24/02; H04W 60/04; H04W 36/0083; H04W 8/24; G06N 20/00
See application file for complete search history.

(56) References Cited

U.S. PATENT DOCUMENTS 11,026,103 B2 *    6/2021    Gupta ..................... H04L 41/16
12,089,291 B2 *    9/2024    Zhu ......................... H04L 41/16
(Continued)

FOREIGN PATENT DOCUMENTS

WO      2020171803 A1     8/2020
WO      2021048600 A1     3/2021
WO      2021048742 A1     3/2021

OTHER PUBLICATIONS

International Search Report and Written Opinion of the International Searching Authority issued Aug. 12, 2022 for corresponding PCT International Application No. PCT/US2022/027141 (8 pp).
(Continued)

*Primary Examiner* — Abdullahi E Salad
(74) *Attorney, Agent, or Firm* — Gray Ice Higdon, PLLC

(57) ABSTRACT

This disclosure describes systems, methods, and devices related to collaboration between user equipment (UE) and network for machine learning. A radio access network (RAN) node B device may transmit, to the UE device, an indication that the node B device supports machine learning; identify a service registration, received from the UE device, indicating that the UE device requests machine learning support from the node B device; transmit, to the UE device, a request for information associated with the UE device, the information associated with at least one of hardware capabilities or machine learning capabilities of the UE device; identify the information received from the UE based on the request for information; and transmit, to the UE device, a machine learning configuration for use by the UE device,
(Continued)

wherein the machine learning configuration is based on the information.

20 Claims, 5 Drawing Sheets

(56) References Cited

U.S. PATENT DOCUMENTS

| | | | |
|---|---|---|---|
| 12,120,774 B2 * | 10/2024 | Tomala .................. | G06N 20/00 |
| 2020/0382968 A1 | 12/2020 | Gupta et al. | |
| 2020/0410389 A1 * | 12/2020 | Jain ........................ | G06N 20/00 |
| 2021/0385682 A1 * | 12/2021 | Bedekar .................. | H04W 8/24 |
| 2023/0180025 A1 * | 6/2023 | Liu ........................ | H04W 24/02 |
| | | | 455/414.1 |
| 2024/0187991 A1 * | 6/2024 | Rydén .................. | H04W 24/10 |

OTHER PUBLICATIONS

CMCC, "Remaining issues on NR QoE management," R3-210900, 3GPP TSG-RAN WG3 #111-e, Jan. 15, 2021 (Sections 2.1-2.2).

* cited by examiner

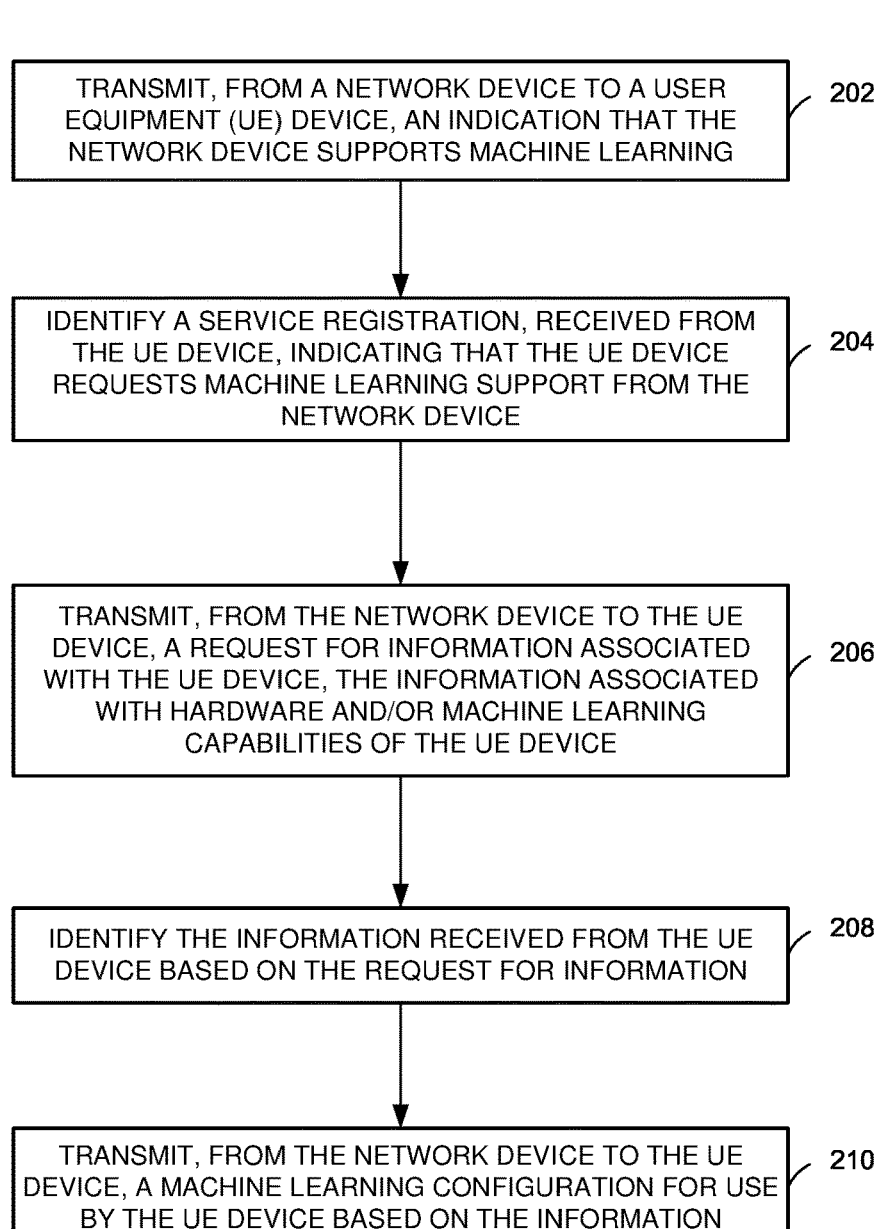

200

TRANSMIT, FROM A NETWORK DEVICE TO A USER EQUIPMENT (UE) DEVICE, AN INDICATION THAT THE NETWORK DEVICE SUPPORTS MACHINE LEARNING    202

IDENTIFY A SERVICE REGISTRATION, RECEIVED FROM THE UE DEVICE, INDICATING THAT THE UE DEVICE REQUESTS MACHINE LEARNING SUPPORT FROM THE NETWORK DEVICE    204

TRANSMIT, FROM THE NETWORK DEVICE TO THE UE DEVICE, A REQUEST FOR INFORMATION ASSOCIATED WITH THE UE DEVICE, THE INFORMATION ASSOCIATED WITH HARDWARE AND/OR MACHINE LEARNING CAPABILITIES OF THE UE DEVICE    206

IDENTIFY THE INFORMATION RECEIVED FROM THE UE DEVICE BASED ON THE REQUEST FOR INFORMATION    208

TRANSMIT, FROM THE NETWORK DEVICE TO THE UE DEVICE, A MACHINE LEARNING CONFIGURATION FOR USE BY THE UE DEVICE BASED ON THE INFORMATION    210

FIG. 2

ENHANCED COLLABORATION BETWEEN USER EQUIPMENT AND NETWORK TO FACILITATE MACHINE LEARNING

CROSS-REFERENCE TO RELATED APPLICATION(S)

This application is a U.S. National Stage Application under 35 U.S.C. 371 and claims the priority benefit of International Application No. PCT/US2022/027141, filed Apr. 29, 2022 and PCT Provisional Application No. PCT/CN2021/091798, filed May 2, 2021, the disclosures of which are incorporated by reference as set forth in full.

TECHNICAL FIELD

This disclosure generally relates to systems and methods for wireless communications and, more particularly, to network and user equipment device collaboration for machine learning in $5^{th}$ Generation (5G) and 6th Generation (6G) communications.

BACKGROUND

Wireless devices are becoming widely prevalent and are increasingly using wireless channels. The $3^{rd}$ Generation Partnership Program (3GPP) is developing one or more standards for wireless communications.

BRIEF DESCRIPTION OF THE DRAWINGS

FIG. 2 illustrates a flow diagram of illustrative process for network and user equipment collaboration to facilitate machine learning on the user equipment, in accordance with one or more example embodiments of the present disclosure.

DETAILED DESCRIPTION

Figure 1:
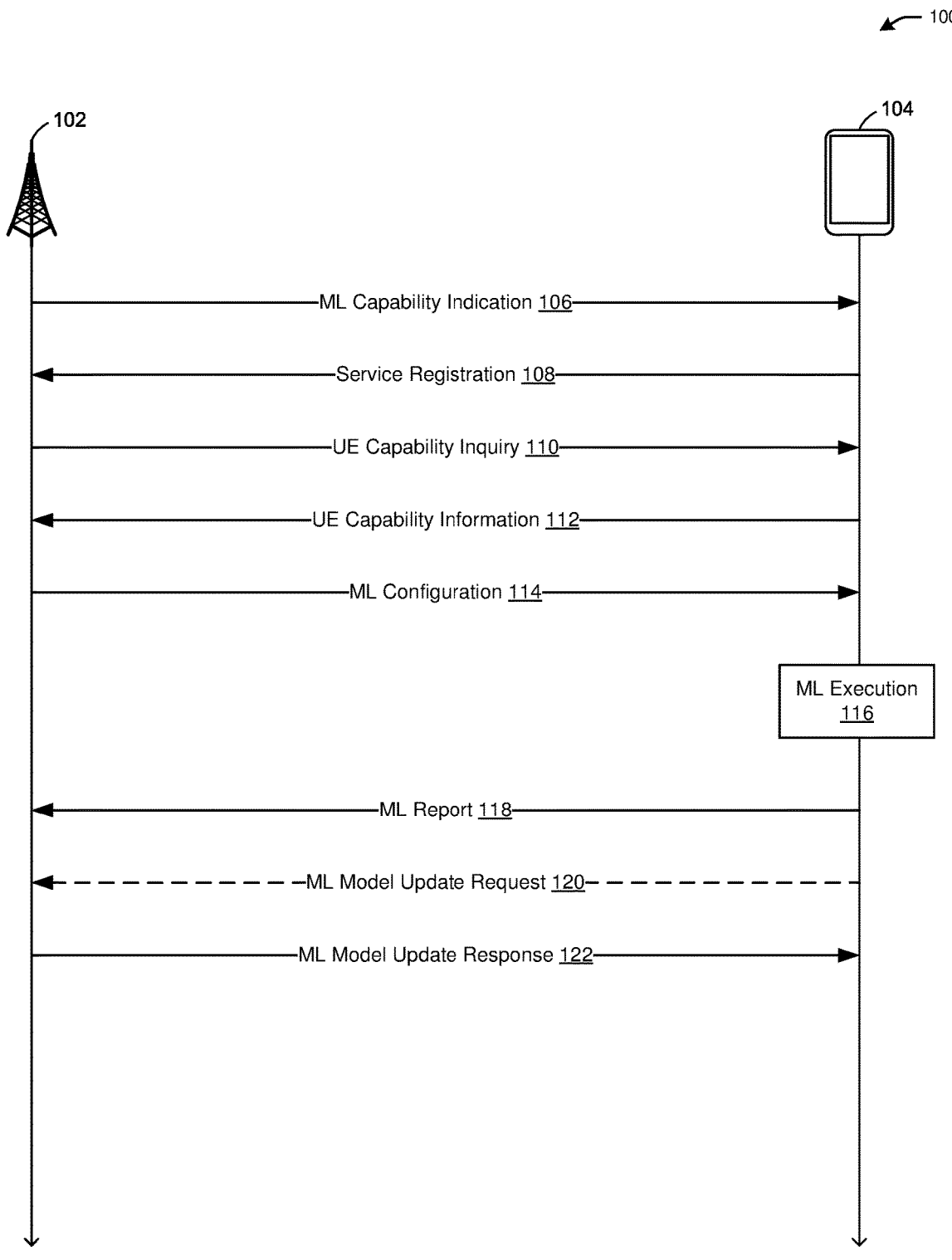
FIG. 1 shows an example process for network and user equipment collaboration to facilitate machine learning on the user equipment, according to some example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Wireless devices may perform measurements as defined by technical standards. For cellular telecommunications, standardization groups such as the $3^{rd}$ Generation Partnership Program (3GPP) and the Open Radio Access Network (O-RAN) Alliance define communication techniques, including for using machine learning with $5^{th}$ Generation (5G) network devices and user equipment (UE) devices.

Machine learning applications in use cases of self-organized networks (SONs) and minimization of drive tests (MDTs) are being studied in 3GPP RAN3, as part of the study on enhancement for data collection for new radio (NR) and evolved universal mobile telecommunications systems terrestrial radio access (E-UTRA) new radio dual connectivity (ENDC). Some machine learning applications in SON focus on network resource optimization and coordination in NG-RAN (next generation radio access network). However, it would be more beneficial to a wireless network for the UE to take advantage of machine learning outcomes and optimize UE performance jointly with the network or on its own.

Distributed learning and federated learning can be used as the framework supporting joint machine learning capability between a next generation radio access network (NG-RAN) and UE. An example for using federated learning supporting machine learning between NG-RAN and UE has been proposed. However, different from machine learning (ML) applications in NG-RAN nodes where the ML information/models can be transmitted over transport network layer (TNL) interfaces, joint machine learning between network and UE requires coordination and collaboration over an air interface.

Therefore, it is important to support the machine learning capability over air interface signaling, including model deployment, model information update, machine learning configuration, and the like.

In the present disclosure, embodiments related to the coordination between NG-RAN and UE to support federated/distributed learning, including signaling aspects, machine learning based UE behavior and configuration/reporting, and the like, are provided.

The present disclosure provides embodiments/implementations to support machine learning configuration/reporting between NG-RAN and UE over radio resource control (RRC) signaling. Embodiments include new radio bearer(s) and/or a new system information block (SIB) to carry new messages including ML configurations, ML reporting and information update, ML requests, and the like. According to a ML report from a UE, the NG-RAN can also update and provide a ML model to different UEs according to the confidence level/model bias/variance of ML results in the reports from UEs. Considering the different roles that the NG-RAN and UE play in a ML framework, the present disclosure describes how the UE behavior is defined and its corresponding information carried over the air interface.

The ML communication embodiments discussed herein allow for the deployment of distributed learning and federated learning by enabling information exchanges over air interface (e.g., RRC signaling). Information exchanging over air interface can successfully help the coordination and collaboration between network and UE for network performance optimization and resource allocation.

In one or more embodiments, the NG-RAN (e.g., a gNB device) may generate and send a ML capability indication to UEs to indicate that the NG-RAN supports ML (e.g., and may facilitate ML operations at the UE). A UE may respond with an interest indication (e.g., service registration) that indicates for which service a UE requests a ML model for use by the UE. The NG-RAN may generate and send a UE capability inquiry to the UE to request ML and hardware capabilities of the UE, and the UE may respond by providing the NG-RAN with its ML and hardware capabilities. Based on the ML and hardware capabilities of the UE, the NG-RAN may generate a ML configuration for a ML model of a service requested by the UE, and may send the ML model and ML configuration to the UE for use by the UE. Once the UE has implemented the ML model and generated results, the UE may send a ML report to the NG-RAN to report the predictions, outcomes, and action space (e.g., actions that the UE will or is requesting to perform as a result of the ML outcomes). The NG-RAN may provide an updated ML model and/or ML configuration, which may be based on a request from the UE or without UE solicitation.

In one or more embodiments, compared with messages such as UE capability and measurement reports, machine learning model and related parameter updates (e.g., for federated learning) may have a lower priority. A new radio bearer is proposed to be used for carrying such information between NG-RAN and UE.

Signaling Radio Bearers (SRBs) are defined as Radio Bearers (RBs) that are used only for the transmission of RRC and NAS messages (e.g., control plane messages). More specifically, the following SRBs are defined: SRB0 is for RRC messages using the CCCH logical channel. SRB1 is for RRC messages (which may include a piggybacked NAS message) as well as for NAS messages prior to the establishment of SRB2, all using DCCH logical channel. SRB2 is for NAS messages and for RRC messages which include logged measurement information, all using DCCH logical channel. SRB2 has a lower priority than SRB1 and may be configured by the network after AS security activation. SRB3 is for specific RRC messages when UE is in (NG) EN-DC or NR-DC, all using DCCH logical channel. SRB4 is for RRC messages which include application layer measurement reporting information, all using DCCH logical channel. SRB4 can only be configured after security activation. In one or more embodiments, a new SRB is introduced for RRC messages to include machine learning model and model parameters information, all using DCCH logical channel. SRB5 may only be configured after security activation.

In one or more embodiments, it is also possible that a new data radio bearer (e.g., user data plane) can be used to carry machine learning model and parameter updates. The new data radio bearer (e.g. MLRB) may be dedicated for machine learning and mapping to a PDU session. Compared with carrying via SRB, machine learning model transmitted via MLRB from upper layer can thus be intercepted by NG-RAN. Each ML model/service can be mapped to one dedicated PDU session, and it is possible that all machine learning models share the same PDU session which contains different QoS flows carrying different ML models. The priority between different ML models or between ML models and normal traffic can be handled by QoS requirement or logical channel priority.

In one or more embodiments, three types of UE behavior should be considered under RAN-UE joint machine learning optimization: (1) RRC configuration per RAN configuration. In this mode, UE behavior is the same as the legacy mechanism. The difference is how NG-RAN decides the resource allocation and configuration for a certain UE. (2) Policy guided. Per policy guidance, UE decide by itself according to the policy. In this mode, according to the outcome (inference output) from the machine learning model, UE can decide its action based on the policy (Policy Guidance configured via RRC configuration) configured by the network. After action is taken, UE may also be required to send the configuration update via RRC signaling. One example use case is beam management. Assuming distributed learning is adopted at UE side, UE will predict the best receiving beam index or beamforming matrix according to the inference result. UE may also receive a policy guidance from the network. The guidance policy may include a tolerant range of how UE can tune their receiving beams. If the predicted result of receiving beam matrix is within the tolerant range, UE can thus tune its receiving beams. (3) Action guided. UE sends action space to RAN, and perform action according to NG-RAN's feedback. In this mode, UE can either get the direct action from the machine learning model (action in reinforcement learning) or UE decide to take certain action according to the prediction results. However, UE cannot take those actions on its own, as network grants is needed. In this case, UE will send request messages to NG-RAN, indicating the action required at the UE side. Upon receiving this request, according to its own resource status, RAN can decide whether to grant the action or not. For example, UE is performing positioning prediction and the predicted location shows that the UE is moving out of the coverage of cell A. According to the geo-location of other NG-RAN or according to the measurement of neighbor cells, UE can request handover to cell B (if cell B is outperformed cell A) via a handover request. Once RAN accepts the handover request, NG-RAN will send a granted response to the request UE and forward the corresponding UE context to the target cell. In one or more embodiments, before setting machine learning configuration, UE is required to send an indication to NG-RAN to indicate whether NG-RAN can support machine learning or not. A new field "ue-capabilityML-RequestFilter" in a UECapabilityEnquiry message is introduced to request UE radio access capability of support machine learning. Moreover, A new field "ue-capabilityML-Information" in UEInformationRequest message is also used to send the machine learning capability of UE to the network. The present disclosure considers categories of UE capability: (1) Hardware capability; (2) Machine learning capability. For hardware capability, in general, it is used to indicate whether the hardware of UE chip can/want support machine learning or not. Details may also include: Chip type, max battery capacity, UE's current battery status, batching data size, etc. For machine learning capability, it is used to indicate: what type of machine learning model UE can support (e.g. CNN, RNN, RL, Classification, regression, etc.) and for each machine learning model, it includes: maximum model size, training capability, e.g. supported SW library, inference capability, e.g. supported SW library, etc. A Machine learning capability field is used to indicate NG-RAN the machine learning capability of UE. The UECapabilityEnquiry message is used to request UE radio access capabilities for NR as well as for other RATs. Signaling radio bearer: SRB1. RLC-SAP: AM. Logical channel: DCCH. Direction: Network to UE.

In one or more embodiments, a UECapabilityEnquiry message may look as follows:

```
-- ASN1START
-- TAG-UECAPABILITYENQUIRY-START
UECapabilityEnquiry-IEs ::=          SEQUENCE {
ue-CapabilityML-RequestFilter            UE-CapabilityML-RequestFilter,
    nonCriticalExtension          SEQUENCE { }          OPTIONAL
}
-       UE-CapabilityMLRequestFilter
```

-continued

The IE UE-CapabilityMLRequestFilter is used to request filtered UE capabilities.
The filter is common for all capability containers that are requested.

In one or more embodiments, a UE-CapabilityMLRe-
questFilter information element may look as follows:

```
-- ASN1START
-- TAG-UE-CAPABILITYMLREQUESTFILTER-START
UE-CapabilityMLRequestFilter ::=          SEQUENCE {
    machinelearning-Request                 SEQUENCE {
        omitML                            ENUMERATED {true}          OPTIONAL,
-- Need N
        hardwareCapability                          ENUMERATED {true}
OPTIONAL,    -- Need N
        modelCapability                   ENUMERATED {true}          OPTIONAL
-- Need N
    }                                          OPTIONAL,      -- Need N
}
-- TAG-UE-CAPABILITYMLREQUESTFILTER-STOP
-- ASN1STOP
```

Table 1 below provides descriptions of the UE-Capabili-
tyMLRequestFilter field:

TABLE 1

| UE-CapabilityMLRequestFilter field descriptions: UE-CapabilityMLRequestFilter field descriptions |
|---|
| machinelearningRequest |
| This message is used to request hardware or model support capability at UE side. This can be used at network to decide whether and what machine learning model is configured. |
| hardwareCapability |
| Only if this field is present, the UE shall indicate the requested hardware capability to the network. |
| modelCapability |
| Only if this field is present, the UE shall indicate the requested machine learning model capability to the network. |
| omitML |
| Only if this field is present, the UE shall omit the machine learning request from the network. The UE |

In one or more embodiments, the IE UBCapabilityInfor-
mation message is used to transfer UE radio access capabilities requested by the network. Signaling radio bearer:
SRB1. RLC-SAP: AM. Logical channel: DCCH. Direction:
UE to Network.

In one or more embodiments, the UBCapabilityInforma-
tion message may look as follows:

```
-- ASN1START
-- TAG-UECAPABILITYINFORMATION-START
UECapabilityInformation-IEs ::= SEQUENCE {
    ue-CapabilityML-Information      UE-CapabilityML-Information
OPTIONAL,
    nonCriticalExtension                SEQUENCE{ }
OPTIONAL
    }
-- TAG-UECAPABILITYINFORMATION-STOP
-- ASN1STOP
```

In one or more embodiments, the IE UE-CapabilityML-
Information information element contains machine learning
specific capability.

In one or more embodiments, the UECapabilityML-In-
formation information element may look as follows:

```
-- ASN1START
-- TAG-UE-CAPABILITYML-INFORMATION-START
UE-CapabilityML-Information ::=                  SEQUENCE {
hardwareCapability                              HardwareCapability,
modelCapability                                 ModelCapability
}
HardwareCapability ::=                          SEQUENCE {
    chiptype                                                     ENUMERATED
{CPU,GPU,ASIC,TPU,others,spare3,spare2,spare1}               OPTIONAL,
    maxPower                            INETGER(0..100)         OPTIONAL,
    batchsize                                ENUMERATED {1GB,2GB,4GB,8GB,16GB, spare3,
spare2, spare1},        OPTIONAL
    batterycapacity                    INTEGER (0...100)        OPTIONAL,
    currentbatterystatus               INTEGER (0...100)        OPTIONAL,
    currentbattery                     INTEGER (0...100)        OPTIONAL,
}
ModelCapability ::=                             SEQUENCE {
    modeltype                          ENUMERATED {CNN, RNN, Regression, Classification,
RL, spare3, spare2, spare1}                   OPTIONAL,
    modelsize                                ENUMERATED {1GB,2GB,4GB,8GB,16GB, spare3,
spare2, spare1},        OPTIONAL,
    trainingCapability                 ENUMERATED {supported}        OPTIONAL,
    inferenceCapability                   ENUMERATED {supported}           OPTIONAL,
```

-continued

```
}
-- TAG-UE-CAPABILITYML-INFORMATION-STOP
-- ASN1STOP
```

In one or more embodiments, the machine learning configuration may be sent via RRC signaling from the NG-RAN to the UE. To support distributed/federated learning between the NG-RAN and the UE, the following content should be included in the RRC messages: A new message type "MachineLearningConfiguration" can be used to carry machine learning configuration. The information from RAN to UE includes machine learning model, configuration, (and model parameter updates,) etc. Service type: Distributed learning and federated learning have different requirements to information exchanging between NG-RAN and UE. For distributed learning when UE is independently responsible for machine learning training and inference (scenario 1), because NG-RAN is not required to maintain the machine learning model adopted at UE side, UE does not need to download/synchronize machine learning model with NG-RAN. Therefore, NG-RAN does not have to know the machine learning use cases at UE side. For this scenario, the NG-RAN may set the service type as "Default." Another scenario of distributed learning (scenario 2) is that NG-RAN serves as the machine learning training node and the UE as the inference node. UE can download the model trained by RAN according to its interested machine learning service type. Upon receiving such model, UE can start inference based on the input data. "service type" is used to indicate the service where the machine learning model is trained from. Examples include positioning, V2X, channel estimation, etc.

In one or more embodiments, for federated learning, the same machine learning model is shared between NG-RAN and UE (scenario 3). The UE may need to register for a machine learning service and receive the ML model from NG-RAN. Thus, NG-RAN may define certain use cases as different "service types" that can be supported for federated learning between NG-RAN and UE.

In one or more embodiments, the Machine learning Report configuration field specifies machine learning to be performed by the UE, as well as configuration of machine learning reporting types or periodicity, etc.

In one or more embodiments, the ML configuration may include a Machine learning reporting type. For scenario 1, since NG-RAN does not have the machine learning model, UE is only required to forward the outcome from the machine learning model to NG-RAN. This field may include prediction of measurement, performance feedback, UE action space (handover request, etc.). Those reports can be categorized as prediction results and action space.

In one or more embodiments, for federated learning or model deployment from NG-RAN node to the UE, both NG-RAN and UEs may maintain the same machine learning model downloaded from NG-RAN during initialization. As for federated learning, UE will update and iterate local machine learning model based on its own environment and input/output, UE can also report the updated machine learning parameters generated by local nodes to NG-RAN, so that NG-RAN can update the centralized model accordingly. This type of reporting can be called a model parameter update.

In one or more embodiments, for scenario 2 and scenario 3, except for reports mentioned above, NG-RAN may also request the UE to report the "model bias" and "model variance". Details can be found below.

In one or more embodiments, there may be a ML report periodicity and offset. The report periodicity is used to indicate how frequent the UE should report the Model Parameter Update or prediction results to NG-RAN. This periodicity can be per UE basis or per model basis. The periodicity field is used to indicate the periodicity of UE reporting "Model Parameter Update" or "prediction results" to NG-RAN. In case prediction results need immediate feedback from NG-RAN (such as Case 3 above), the field can also be set to zero. Each periodicity corresponds to an offset (given in number of slots), indicating the offset of start time among different UEs.

In one or more embodiments, there may be a ML result storing duration and start time. Duration: In addition to periodicity, for "prediction results" which does not require immediate feedback to NG-RAN, NG-RAN may also configure UE how long it needs to store the prediction results before the periodicity ends. This field is used to indicating how long time the report should be stored at UE. Start time: This field is the start time of UE recording the prediction results.

In one or more embodiments, there may be policy guidance provided by the NG-RAN to the UE. A guided policy can be provided by OAM or CN or gNB itself, indicating the high-level action that UE can perform according to the output of machine learning algorithms at UE side.

In one or more embodiments, UE behavior can either be decided by NG-RAN or by UE itself. This field is used to indicate UE which type of behavior it can be consider upon getting the inference result from machine learning model. The types of UE action include: 1) RRC configuration 2) Policy Guided 3) Action Guided. UE can decide its behavior according to the configured behavior type.

In one or more embodiments, the Model Bias Threshold field sets a model bias threshold to UE when to trigger MachineLearningModelUpdateRequest.

In one or more embodiments, the Model Variance Threshold field sets a model variance threshold to UE when to trigger MachineLearningModelUpdateRequest.

In one or more embodiments, if machine learning model and parameter updates are also carried via control plane, following two fields are also considered to be included in the MachineLearningConfiguration.

In one or more embodiments, the machine learning model may be deployed at a UE. This model can also be joint optimized at NG-RAN and UE if federated learning is used as the framework in machine learning supported NG-RAN network. The model is generated by training node located at network nodes (CU/DU, OAM or CN) and transmitted to UE in the container via the new SRB or via MLRB/DRB in data plane (e.g., as described above). The ML models can also be in the form of identifiers for UE to download the models. According to different UE capability, NG-RAN may assign models with smaller granularity.

In one or more embodiments, the Machine Learning Model field can also include other training related information, such as loss function, optimizer for training. The Machine Learning Model field is optional for distributed learning framework, mandatory for federated framework or model deployment from NG-RAN to UE. If the model size is larger than 8000 bytes, RRC Segmentation is supported.

In one or more embodiments, the Machine Learning Model Parameter Updates field may carry the information used for machine learning model update and iteration, such as hidden layer, weight, gradient etc. Considering the machine learning algorithms vary among different use cases and vendors, those information are generated from the network nodes who performs machine learning training and they are carried in a container passing to UE.

In one or more embodiments, in federated learning framework, it is possible that the central server is located at NG-RAN (e.g. CU or DU), OAM or CN. If OAM or CN plays the role of the central server in federated framework, the model parameters are generated by OAM or CN. One container is used to transfer those parameters between the network and the UE. Under this circumstance, if it is transmitted over control plane, the RRC layer is transparent to this field. If the update model size is larger than 8000 bytes, RRC Segmentation is supported. Transmission via DRB/MLRB in data plane is also considered, in case the data size is large. If NG-RAN (e.g. CU or DU) is the central server, this container will be formed by NG-RAN (e.g. CU or DU, depends on who is the training node).

In one or more embodiments, as for RRC messages, the MachineLearningConfiguration has three options: (1) New field in rrcReconfiguration, which can be carried in either otherConfig field or a new dedicated field. Examples of new field in rrcReconfiguration is shown as below:

```
RRCReconfiguration-vxyz-IEs ::= SEQUENCE {
    machineLearningConfiguration                    MachineLearningConfgiuration    OPTIONAL
}
OtherConfig-vxyz-IEs ::= SEQUENCE {
    machineLearningConfiguration                    MachineLearningConfgiuration    OPTIONAL
}
(2) New DL-DCCH-Message. One example of the RRC signaling from NG-RAN to
UE is shown as below:
-    DL-DCCH-Message
The DL-DCCH-Message class is the set of RRC messages that may be sent from the
network to the UE on the downlink DCCH logical channel.
-- ASN1START
-- TAG-DL-DCCH-MESSAGE-START
DL-DCCH-Message ::=                                 SEQUENCE {
    message                                         DL-DCCH-MessageType
}
DL-DCCH-MessageType ::=                                   CHOICE {
    c1                                             CHOICE {
        rrcReconfiguration                             RRCReconfiguration,
        rrcResume                                      RRCResume,
        rrcRelease                                     RRCRelease,
        rrcReestablishment                             RRCReestablishment,
        securityModeCommand                               SecurityModeCommand,
        dlInformationTransfer                             DLInformationTransfer,
        ueCapabilityEnquiry                               UECapabilityEnquiry,
        counterCheck                                   CounterCheck,
        mobilityFromNRCommand                             MobilityFromNRCommand,
        dlDedicatedMessageSegment-r16                        DLDedicatedMessageSegment-r16,
        ueInformationRequest-r16                       UEInformationRequest-r16,
        dlInformationTransferMRDC-r16                       DLInformationTransferMRDC-r16,
        loggedMeasurementConfiguration-r16                  LoggedMeasurementConfiguration-r16,
        machineLearningConfiguration                      MachineLearningConfiguration,
            spare2 NULL, spare1 NULL
    },
    messageClassExtension                          SEQUENCE { }
}
-- TAG-DL-DCCH-MESSAGE-STOP
-- ASN1STOP
```

In one or more embodiments, a new SIB may be used to indicate the network's ML capability. Except for a machine learning model and machine learning model parameter update, other fields also may be broadcasted to UE(s) via a new SIB.

In one or more embodiments, an example of a Machine-LearningConfiguration message and information elements are shown as below:

MachineLearningConfiguration

The MachineLearningConfiguration message is used to perform machine learning at UE side. It is used to transfer the machine learning configuration for enabling machine learning services for network performance optimization.

```
Signalling radio bearer: SRBX
RLC-SAP: AM
Logical channel: DCCH
Direction: Network to UE
MachineLearningConfiguration message
-- ASN1START
-- TAG-MACHINELEARNINGCONFIGURATION-START
MachineLearningConfiguration ::= SEQUENCE {
    criticalExtensions                          CHOICE {
        machineLearningConfiguration                MachineLearningConfiguration-IEs,
        criticalExtensionsFuture                    SEQUENCE { }
    }
}
MachineLearningConfiguration-IEs ::= SEQUENCE {
    serviceType                                 ENUMERATED {default, positioning, V2X, spare5,
spare4, spare3, spare2, spare1 }                    OPTIONAL,
        machineLearningReportConfiguration          MachineLearningReportConfiguration,
    policyGuidance                          OCTET STRING (SIZE(1..8000))            OPTIONAL,
    machineLearningModelUpdate                      machineLearningModelUpdate,
        lateNonCriticalExtension                OCTET STRING                    OPTIONAL,
        nonCriticalExtension                    SEQUENCE { }                    OPTIONAL
}
MachineLearningReportConfiguration ::=              SEQUENCE {
    reportType                              ENUMERATED {prediction-result, action-space, model-
update, model-bias, model-variance, spare3, spare2, spare1},
    behaviorType                            ENUMERATED {rrc-config, policy-guided, action-
guided, spare4, space3, space2, space1},
    reportPeriodicityAndOffset                      MachinelearningPeriodicityAndOffset,
    reportDurationAndStarttime                      MachineLearningDurationAndStarttime,
    predictionResultConfiguration                   PredictionResultConfiguration,
    actionSpaceConfiguration                        ActionSpaceConfiguration,
    ...
}
MachineLearningModelUpdate ::=                      SEQUENCE {
    machineLearningModel                        OCTET STRING (SIZE(1..8000))        OPTIONAL,
    modelUpdate                             OCTET STRING (SIZE(1..8000))        OPTIONAL,
    ...
}
MachinelearningPeriodicityAndOffset ::=             SEQUENCE {
    slots4                                      INTEGER(0..3),
    slots5                                      INTEGER(0..4),
    slots8                                      INTEGER(0..7),
    slots10                                     INTEGER(0..9),
    slots16                                     INTEGER(0..15),
    slots20                                     INTEGER(0..19),
    slots40                                     INTEGER(0..39),
    slots80                                     INTEGER(0..79),
    slots160                                    INTEGER(0..159),
    slots320                                    INTEGER(0..319)
}
-- TAG-MACHINELEARNINGCONFIGURATION-STOP
-- ASN1STOP
```

Table 2 below shows MachineLearningConfiguration field descriptions:

TABLE 2

| MachineLearningConfiguration field descriptions: MachineLearningConfiguration field descriptions |
| --- |
| serviceType<br>Indicates the machine learning services that the UE is registered.<br>If UE performs machine learning on its own and requires no machine learning model from network side, the service type is set to "Default".<br>policyGuidance<br>Indicate the guided policy from the network.<br>reportType<br>Indicates the type of reporting that the UE reports after performing machine learning services.<br>reportPeriodicity<br>This field indicates the periodicity of reporting the configured report type. Value ms 20 corresponds to 20 ms, ms 50 corresponds to 50 ms and so on.<br>machineLearningModel<br>This field contains container of machine learning model. The machine learning model can either be generated from NG-RAN itself or received from upper layers. |

TABLE 2-continued

| MachineLearningConfiguration field descriptions: MachineLearningConfiguration field descriptions |
| --- |
| modelUpdate<br>This field contains container of machine learning parameters updated after training or upon receiving model-update report from the UE.<br>predictionResultConfiguration<br>This field contains the configuration of prediction results need to be reported to the network after the UE performs machine learning. It should be specific for different use cases. |

In one or more embodiments, the ML report may be sent via RRC signaling from UE to NG-RAN. The information uploaded/reported from UE to RAN includes machine learning model parameter updates, prediction results, action space, feedback (e.g., model performance feedback and/or wireless feedback (e.g., system KPI, e.g. throughput/latency, etc.)) via a new message type "MachineLearningReport". The reporting types depends on the Machine learning reporting types configuration received from NG-RAN. If the report size is larger than 8000 bytes, RRC Segmentation is supported. The service type field is used to report the registered machine learning service(s) to NG-RAN. If report type is configured as "Machine learning model parameter updates," UE will report the corresponding updated parameters which is updated by itself according to environment and local training. If report type is configured as "prediction result," UE will report the prediction values which is the outcome of machine learning model. The prediction values may be different among different machine learning use cases, some examples can be channel matrix prediction, CSI prediction, position prediction, etc. This field can be carried in the new message "MachineLearningReport". Or if there's a corresponding measurement report or information sent from UE to RAN, the prediction results can also be included in the same message/field as the legacy report, but with a separate IE specifically for prediction values. The current/expected feedback is also reported back together with prediction results. The expected feedback represents what the UE's performance looks like if the corresponding prediction results are used by UE.

In one or more embodiments, according to the output of machine learning algorithms, UE can also decide its own action according to the guidance policy (embodiment 4) received from NG-RAN or direct outcome from machine learning algorithm. If report type is configured as "action space," UE will then send its action space to NG-RAN and channel quality and positioning, UE may request a handover to a neighbor cell. In this case, UE will send its preferred neighbor cell identity and related information to NG-RAN requesting handover. The preferred neighbor cell identity and handover request in this example can be called as action space. The current/expected feedback is also reported back together with prediction results. The expected feedback represents what will be the UE's performance looks like if the corresponding action is taken by UE.

In one or more embodiments, when input data cannot fit to the inference/trained model well at UE side, UE would calculate the bias of the model and report to NG-RAN. The values can be categorized into different levels, for example, poor bias, less poor bias, no bias, etc.

In one or more embodiments, according to different input data and environment, it is possible that the inference model or trained model could hardly fit to the input data. Hence, this field is used to report the variance of the machine learning model.

In one or more embodiments, a confidence level is introduced to indicate how much network can trust the reporting from the UE.

One example of the RRC signaling from UE to NG-RAN is shown as below. The—DCCH-Message class is the set of RRC messages that may be sent from the UE to the network on the uplink DCCH logical channel:

```
-- ASN1START
-- TAG-UL-DCCH-MESSAGE-START
UL-DCCH-Message ::=                          SEQUENCE {
    message                                  UL-DCCH-MessageType
}
UL-DCCH-MessageType ::=                          CHOICE {
    c1                                     CHOICE {
        measurementReport                        MeasurementReport,
        rrcReconfigurationComplete                   RRCReconfigurationComplete,
        rrcSetupComplete                      RRCSetupComplete,
        rrcReestablishmentComplete                   RRCReestablishmentComplete,
        rrcResumeComplete                     RRCResumeComplete,
        securityModeComplete                      SecurityModeComplete,
        securityModeFailure                    SecurityModeFailure,
        ulInformationTransfer                     ULInformationTransfer,
        locationMeasurementIndication                   LocationMeasurementIndication,
        ueCapabilityInformation                   UECapabilityInformation,
        counterCheckResponse                   CounterCheckResponse,
        ueAssistanceInformation                   UEAssistanceInformation,
        failureInformation                    FailureInformation,
        ulInformationTransferMRDC                    ULInformationTransferMRDC,
        scgFailureInformation                  SCGFailureInformation,
        scgFailureInformationEUTRA                    SCGFailureInformationEUTRA
    },
    messageClassExtension                     CHOICE {
        c2                                   CHOICE {
            ulDedicatedMessageSegment-r16                    ULDedicatedMessageSegment-r16,
            dedicatedSIBRequest-r16                   DedicatedSIBRequest-r16,
            mcgFailureInformation-r16                   MCGFailureInformation-r16,
            ueInformationResponse-r16                   UEInformationResponse-r16,
            sidelinkUEInformationNR-r16                   SidelinkUEInformationNR-r16,
            ulInformationTransferIRAT-r16                   ULInformationTransferIRAT-r16,
            iabOtherInformation-r16                   IABOtherInformation-r16,
            machineLearningReport                   MachineLearningReport,
            spare8 NULL, spare7 NULL, spare6 NULL,
            spare5 NULL, spare4 NULL, spare3 NULL, spare2 NULL, spare1 NULL
        },
        messageClassExtensionFuture-r16 SEQUENCE { }
    }
}
-- TAG-UL-DCCH-MESSAGE-STOP
-- ASN1STOP
``` let NG-RAN to decide how UE should perform. The action space can either be a request or a report. For example, for mobility enhancement use case, according to the predicted In one or more embodiments, the MachineLearningReport message is used for the indication of measurement results. Signalling radio bearer: SRBX. RLC-SAP: AM.

Logical channel: DCCH. Direction: UE to Network. The MachineLearningReport message may look as follows:

it is possible that some machine learning model cannot be converged at certain UE(s) or the prediction result is out of

```
-- ASN1START
-- TAG-MACHINELEARNINGREPORT-START
MachineLearningReport ::=              SEQUENCE {
    criticalExtensions                 CHOICE {
        machineLearningReport                  MachineLearningReport-IEs,
        criticalExtensionsFuture       SEQUENCE { }
    }
}
MachineLearningReport-IEs ::=              SEQUENCE {
    serviceType                       ENUMERATED {default, positioning, V2X, spare5, spare4,
spare3, spare2, spare1}                     OPTIONAL,
    modelUpdate                       OCTET STRING (SIZE(1..8000))      OPTIONAL,
    modelBias                         ENUMERATED {poor-bias, less-poor, no-bias, spare5,
spare4, spare3, spare2, spare1}     OPTIONAL,
    modelVariance                     INTEGER (0,...,100)                        OPTIONAL,
    predictionResult                  PredictionResult                   OPTIONAL,
    confidenceLevel                   ENUMERATED {0, 1, 2, ..., 10}             OPTIONAL,
    modelPerformanceFeedback          ENUMERATED {good, medium, poor} OPTIONAL,
    userPerformanceFeedback           ENUMERATED                    {increase,   decrease,   fair}
OPTIONAL,
    lateNonCriticalExtension              OCTET STRING               OPTIONAL,
    nonCriticalExtension              SEQUENCE{ }                 OPTIONAL
}
-- TAG-MEASUREMENTREPORT-STOP
-- ASN1STOP
``` userPerformanceFeedback can further break down to IEs, e.g. throughput, latency, QoS, etc.

Table 3 below shows MachineLearningConfiguration field descriptions:

TABLE 3

| MachineLearningConfiguration field descriptions: MachineLearningConfiguration field descriptions |
| --- |
| modelUpdate This field contains container of machine learning parameters updated after local training at the UE. predictionResult This field contains the prediction results need to be reported to the network after the UE performs machine learning. It should be specific for different use cases. confidenceLevel This field indicates how much network can trust the prediction results or model parameters generated by the UE. Value 0 represents UE prediction is not accurate, Value 10 represents the network should fully take the report into account. |

In one or more embodiments, for a ML model update request and response exchange, when RAN and UE are coordinated with federated learning framework or model deployed from NG-RAN to the UE. Each UE will train the machine learning model locally if federated learning is considered. However, after certain time (e.g., before UE needs to report "Machine learning model parameter update,"

the tolerant range according to the policy. In this case, UE can send a "MachineLearningModelUpdateRequest" to the network, requesting a parameter update to the corresponding machine learning model. Upon receiving the request, network will send "MachineLearningModelUpdateResponse" messages which includes "MachineLearningModelUpdate" and corresponding service type.

In one or more embodiments, there may be a UE selective training/ML model update. "ConfidenceLevel" is introduced to show how network can trust the model updated by UE or the prediction results get from UE. According to the "confidenceLevel" reported by UE, NG-RAN can selectively update machine learning model to different UEs. NG-RAN can prioritize to update machine learning models to UEs with lower rate of confidenceLevel.

In one or more embodiments, the network's ML capability may be indicated by a new SIB. This new SIB (e.g. SIBX) contains information related to machine learning. It may contain following information: Network machine learning capability, machine learning services that the network can provide, and for each service, the information includes: required software library, required machine learning model, required memory size (e.g., unit: MB/KB), other information (e.g., machine learning configurations). An example of this new SIB is shown as below:

```
-SIBX
SIBX5 contains machine learning related information.
    -- ASN1START
    -- TAG-SIB15-START
    SIB15-rxyz ::=                          SEQUENCE{
        MachineLearningSupport                  ENUMERATED{true,false},
        mlServiceInfoList                       MLServiceInfoList                      OPTIONAL,
        (machineLearningConfiguration                   MachineLearningConfiguration
OPTIONAL,)
        ...
    }
    MLServiceInfoList ::=                       SEQUENCE (SIZE (1..maxMLSerivce)) OF
MLServiceInfo
    MLServiceInfo ::=                          SEQUENCE {
```

-continued

```
    mlServiceId                         MIServiceId,
    memoryRequirement                   INTEGER (1,...,1000),
    requiredMlModelList                 MLModelList,
    requiredMlSoftwareLibList               MLModelSoftwareLibList,
    ...
}
MLModelList ::=                     SEQUENCE (SIZE (1..maxModel)) OF MLModel
MLModelSoftwareLibList   ::=                 SEQUENCE (SIZE (1..maxSoftLib)) OF
MlLSoftwareLib
  MLModel ::= ENMERATED {CNN, RNN, NN, DQN, RandomForest, ...}
  MLSoftwareLib ::= ENUMERATED {numpy, scipy, ...}
  -- TAG-SIB15-STOP
  -- ASN1STOP
```

In one or more embodiments, there may be a service registration/interest indication message. Upon receiving the service list provided by network (carried in network capability indication in Embodiment 8), UE(s) send their interested service type/ID to the network and requesting such service(s). If UE is interested and request receiving machine learning model from the network, UE send the requested service ID/service type to the network.

In one or more embodiments, there may be an action feedback message. For action-guided RAN-UE machine learning coordination, instead of sending RRC configuration to UE, network can send a new message carrying action feedback instead. This can reduce reconfigure such UE and reduce message size over air interface. This feedback can either be action grant or action denied.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 shows an example process 100 for network and user equipment collaboration to facilitate machine learning on the user equipment, according to some example embodiments of the present disclosure.

Referring to FIG. 1, the process 100 may include a network device 102 (e.g., a gNB) and a UE device 104 collaborating to allow the UE device 104 to perform ML. The network device 102 may generate and send a ML capability indication 106 to indicate that the network device 102 may provide ML models and configurations for one or more services, and may collaborate with the UE device 104 to provide the relevant ML models, configurations, and other data to allow the UE device 104 to perform ML. The UE device 104 may respond by generating and sending a service registration 108 (e.g., an interest indication) that indicates to the network device 102 that the UE device 104 is interested in ML for one or more of the services advertised by the network device 102. The network device 102 may generate and send a UE capability inquiry 110 to the UE device 104 to request the UE device 104 to provide information about the UE's capabilities (e.g., ML capabilities and/or hardware capabilities). The UE device 104 may respond by generating and sending UE capability information 112 (e.g., indicating ML and/or hardware capabilities). Based on the UE capability information 112, the network device 102 may select or generate a ML configuration 114 for the UE device 104, and may send the ML configuration 114 to the UE device. For example, based on any requested service in the service registration 108, the network device 102 may select a ML model and a ML configuration for the ML model for the service based on the UE capability information 112 (e.g., a ML model/configuration using more or fewer resources depending on the UE capability information 112).

Still referring to FIG. 1, after receiving the ML model and ML configuration 114, the UE device 104 may execute the ML model based on the ML configuration 114. Once the UE device 104 has executed the ML model and generated corresponding outputs, the UE device 104 may generate and send a ML report 118 to the network device 102. The ML report 118 may indicate predictions prior to the ML execution 116, outcomes of the ML execution 116 (e.g., actual outputs of the ML execution 116), and requested or selected actions (e.g., an action space) for the UE device 104 to perform based on the ML execution 116. The ML model and/or configuration may be trained and/or updated by the network device 102 and/or the UE device 104. When the ML model and/or configuration is updated by the network device 102, the UE device 104 periodically and optionally may generate and send a ML model update request 120 to the network device 102 to request the update. The network device 102 may generate and send the model update response 122 with updated ML models and configurations, optionally in response to the ML model update request 120, or without the UE device 104 requesting the update.

In one or more embodiments, the ML capability indication 106 may be sent via a SIB.

In one or more embodiments, the ML configuration 114 and the ML report 118 may be sent using a new SRB or a new data radio bearer.

In one or more embodiments, the network device 102 may initiate the ML configuration procedure by sending the ML configuration 114 message.

The UE device 104 may include any suitable processor-driven device including, but not limited to, a mobile device or a non-mobile, e.g., a static device. For example, the UE device 104 may include, a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

Any of the UE device 104 and the network device 102 may include one or more communications antennas. The one or more communications antennas may be any suitable type of antennas corresponding to the communications protocols used by the UE device 104 and the network device 102. Some non-limiting examples of suitable communications antennas include 3GPP antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the UE device 104 and the network device 102.

FIG. 2 illustrates a flow diagram of illustrative process 200 for network and user equipment collaboration to facilitate machine learning on the user equipment, in accordance with one or more example embodiments of the present disclosure.

At block 202, a device (e.g., the network device 102 of FIG. 1, the NG-RAN 314 of FIG. 3) may generate and transmit, to a UE device (e.g., the UE device 104 of FIG. 1), an indication that the network device supports ML (e.g., the ML capability indication 106 of FIG. 1).

At block 204, the device may identify a service registration (e.g., the service registration 108 of FIG. 1) received from the UE device. The service registration may indicate a request for ML models and configurations for one or more services supported by the device.

At block 206, the device may generate and transmit, to the UE device, a request for information (e.g., the UE capability inquiry 110 of FIG. 1) to the UE device to request ML and/or hardware capabilities of the UE device. The device may rely on this information to select/generate a ML configuration, ML parameters, policies, and the like to send to the UE device for use by the UE device. For example, a given service may have one or multiple ML models with different parameters that may be selected based on the UE device's ML and/or hardware capabilities.

At block 208, the device may identify the information received from the UE device (e.g., the UE capability information 112 of FIG. 1). The device may select models and configurations based on which models and configurations the UE device supports and that meet hardware capabilities of the UE device.

At block 210, the device may generate/select and transmit, to the UE device, a machine learning configuration and a ML model (e.g., the ML configuration 114 of FIG. 1) based on the information received from the UE device. The device may update the ML model and/or configuration, optionally in response to a request received from the UE device and/or in response to a ML report provided by the UE device (e.g., indicating what the results were of execution of the ML model in comparison with predicted results). The device may provide policies to govern the decisions of the UE device with respect to use of and outcomes of the ML model, and/or may receive respond to requests (e.g., confirm or reject) received from the UE device regarding which actions the UE device may perform based on results of execution of the ML model.

It is understood that the above descriptions are for purposes of illustration and are not meant to be limiting.

Figure 3:
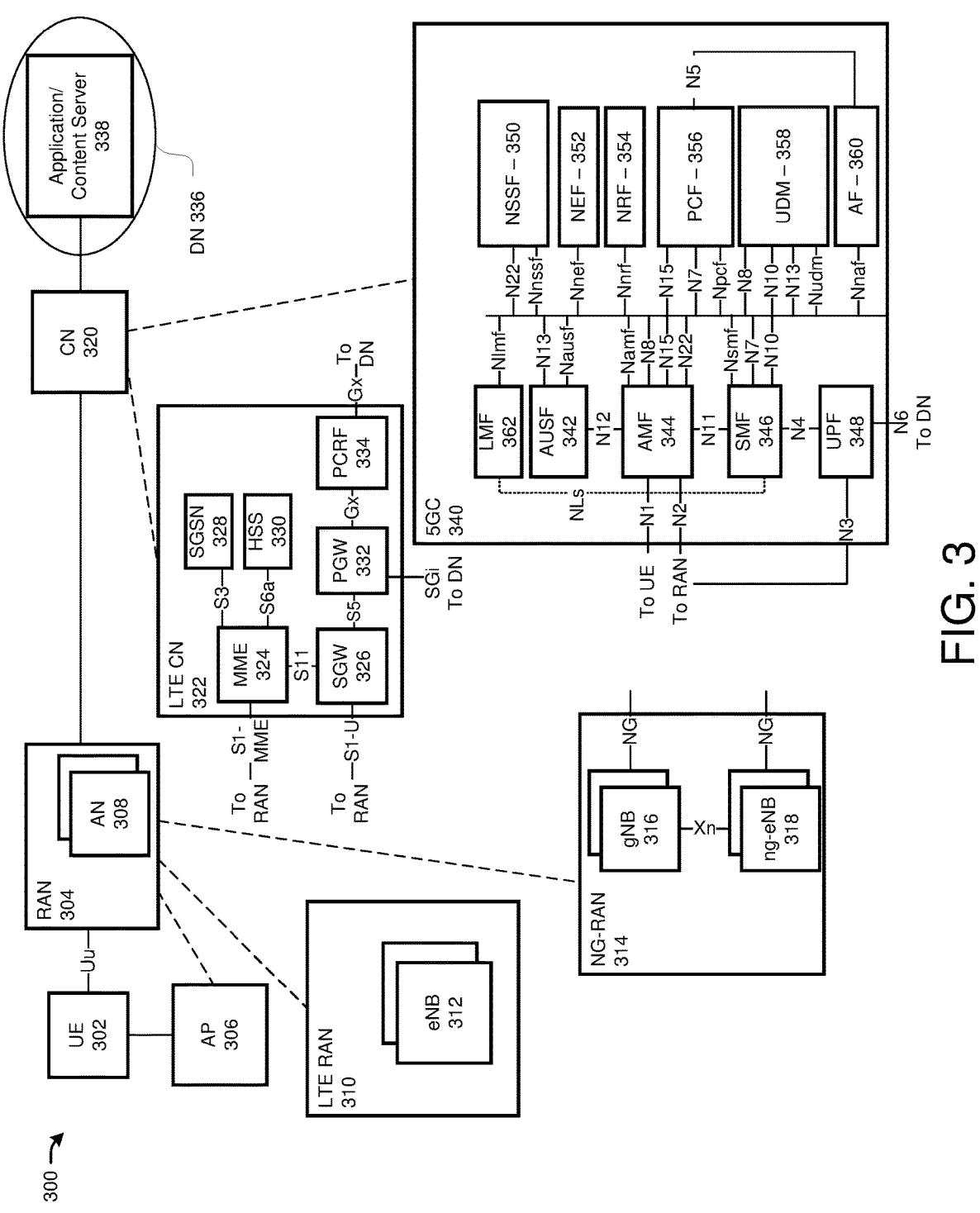
FIG. 3 illustrates a network, in accordance with one or more example embodiments of the present disclosure.

FIG. 3 illustrates a network 300, in accordance with one or more example embodiments of the present disclosure.

The network 300 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 300 may include a UE 302, which may include any mobile or non-mobile computing device designed to communicate with a RAN 304 via an over-the-air connection.

The UE 302 may be communicatively coupled with the RAN 304 by a Uu interface. The UE 302 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 300 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 302 may additionally communicate with an AP 306 via an over-the-air connection. The AP 306 may manage a WLAN connection, which may serve to offload some/all network traffic from the RAN 304. The connection between the UE 302 and the AP 306 may be consistent with any IEEE 802.11 protocol, wherein the AP 306 could be a wireless fidelity (Wi-Fi®) router. In some embodiments, the UE 302, RAN 304, and AP 306 may utilize cellular-WLAN aggregation (for example, LWA/LWIP). Cellular-WLAN aggregation may involve the UE 302 being configured by the RAN 304 to utilize both cellular radio resources and WLAN resources.

The RAN 304 may include one or more access nodes, for example, AN 308. AN 308 may terminate air-interface protocols for the UE 302 by providing access stratum protocols including RRC, PDCP, RLC, MAC, and L1 protocols. In this manner, the AN 308 may enable data/voice connectivity between CN 320 and the UE 302. In some embodiments, the AN 308 may be implemented in a discrete device or as one or more software entities running on server computers as part of, for example, a virtual network, which may be referred to as a CRAN or virtual baseband unit pool. The AN 308 be referred to as a BS, gNB, RAN node, eNB, ng-eNB, NodeB, RSU, TRxP, TRP, etc. The AN 308 may be a macrocell base station or a low power base station for providing femtocells, picocells or other like cells having smaller coverage areas, smaller user capacity, or higher bandwidth compared to macrocells.

In embodiments in which the RAN 304 includes a plurality of ANs, they may be coupled with one another via an X2 interface (if the RAN 304 is an LTE RAN) or an Xn interface (if the RAN 304 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 304 may each manage one or more cells, cell groups, component carriers, etc. to provide the UE 302 with an air interface for network access. The UE 302 may be simultaneously connected with a plurality of cells provided by the same or different ANs of the RAN 304. For example, the UE 302 and RAN 304 may use carrier aggregation to allow the UE 302 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 304 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 302 or AN 308 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 304 may be an LTE RAN 310 with eNBs, for example, eNB 312. The LTE RAN 310 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 304 may be an NG-RAN 314 with gNBs, for example, gNB 316, or ng-eNBs, for example, ng-eNB 318. The gNB 316 may connect with 5G-enabled UEs using a 5G NR interface. The gNB 316 may connect with a 5G core through an NG interface, which may include an N2 interface or an N3 interface. The ng-eNB 318 may also connect with the 5G core through an NG interface, but may connect with a UE via an LTE air interface. The gNB 316 and the ng-eNB 318 may connect with each other over an Xn interface.

In some embodiments, the NG interface may be split into two parts, an NG user plane (NG-U) interface, which carries traffic data between the nodes of the NG-RAN 314 and a UPF 348 (e.g., N3 interface), and an NG control plane (NG-C) interface, which is a signaling interface between the nodes of the NG-RAN 314 and an AMF 344 (e.g., N2 interface).

The NG-RAN 314 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHZ. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 302 can be configured with multiple BWPs where each BWP configuration has a different SCS. When a BWP change is indicated to the UE 302, the SCS of the transmission is changed as well. Another use case example of BWP is related to power saving. In particular, multiple BWPs can be configured for the UE 302 with different amount of frequency resources (for example, PRBs) to support data transmission under different traffic loading scenarios. A BWP containing a smaller number of PRBs can be used for data transmission with small traffic load while allowing power saving at the UE 302 and in some cases at the gNB 316. A BWP containing a larger number of PRBs can be used for scenarios with higher traffic load.

The RAN 304 is communicatively coupled to CN 320 that includes network elements to provide various functions to support data and telecommunications services to customers/subscribers (for example, users of UE 302). The components of the CN 320 may be implemented in one physical node or separate physical nodes. In some embodiments, NFV may be utilized to virtualize any or all of the functions provided by the network elements of the CN 320 onto physical compute/storage resources in servers, switches, etc. A logical instantiation of the CN 320 may be referred to as a network slice, and a logical instantiation of a portion of the CN 320 may be referred to as a network sub-slice.

In some embodiments, the CN 320 may be an LTE CN 322, which may also be referred to as an EPC. The LTE CN 322 may include MME 324, SGW 326, SGSN 328, HSS 330, PGW 332, and PCRF 334 coupled with one another over interfaces (or "reference points") as shown. Functions of the elements of the LTE CN 322 may be briefly introduced as follows.

The MME 324 may implement mobility management functions to track a current location of the UE 302 to facilitate paging, bearer activation/deactivation, handovers, gateway selection, authentication, etc.

The SGW 326 may terminate an SI interface toward the RAN and route data packets between the RAN and the LTE CN 322. The SGW 326 may be a local mobility anchor point for inter-RAN node handovers and also may provide an anchor for inter-3GPP mobility. Other responsibilities may include lawful intercept, charging, and some policy enforcement.

The SGSN 328 may track a location of the UE 302 and perform security functions and access control. In addition, the SGSN 328 may perform inter-EPC node signaling for mobility between different RAT networks; PDN and S-GW selection as specified by MME 324; MME selection for handovers; etc. The S3 reference point between the MME 324 and the SGSN 328 may enable user and bearer information exchange for inter-3GPP access network mobility in idle/active states.

The HSS 330 may include a database for network users, including subscription-related information to support the network entities' handling of communication sessions. The HSS 330 can provide support for routing/roaming, authentication, authorization, naming/addressing resolution, location dependencies, etc. An S6a reference point between the HSS 330 and the MME 324 may enable transfer of subscription and authentication data for authenticating/authorizing user access to the LTE CN 320.

The PGW 332 may terminate an SGi interface toward a data network (DN) 336 that may include an application/content server 338. The PGW 332 may route data packets between the LTE CN 322 and the data network 336. The PGW 332 may be coupled with the SGW 326 by an S5 reference point to facilitate user plane tunneling and tunnel management. The PGW 332 may further include a node for policy enforcement and charging data collection (for example, PCEF). Additionally, the SGi reference point between the PGW 332 and the data network 336 may be an operator external public, a private PDN, or an intra-operator packet data network, for example, for provision of IMS services. The PGW 332 may be coupled with a PCRF 334 via a Gx reference point.

The PCRF 334 is the policy and charging control element of the LTE CN 322. The PCRF 334 may be communicatively coupled to the app/content server 538 to determine appropriate QoS and charging parameters for service flows. The PCRF 332 may provision associated rules into a PCEF (via Gx reference point) with appropriate TFT and QCI.

In some embodiments, the CN 320 may be a 5GC 340. The 5GC 340 may include an AUSF 342, AMF 344, SMF 346, UPF 348, NSSF 350, NEF 352, NRF 354, PCF 356, UDM 358, AF 360, and LMF 362 coupled with one another over interfaces (or "reference points") as shown. Functions of the elements of the 5GC 340 may be briefly introduced as follows.

The AUSF 342 may store data for authentication of UE 302 and handle authentication-related functionality. The AUSF 342 may facilitate a common authentication framework for various access types. In addition to communicating with other elements of the 5GC 340 over reference points as shown, the AUSF 342 may exhibit an Nausf service-based interface.

The AMF 344 may allow other functions of the 5GC 340 to communicate with the UE 302 and the RAN 304 and to subscribe to notifications about mobility events with respect to the UE 302. The AMF 344 may be responsible for registration management (for example, for registering UE 302), connection management, reachability management, mobility management, lawful interception of AMF-related events, and access authentication and authorization. The AMF 344 may provide transport for SM messages between the UE 302 and the SMF 346, and act as a transparent proxy for routing SM messages. AMF 344 may also provide transport for SMS messages between UE 302 and an SMSF. AMF 344 may interact with the AUSF 342 and the UE 302 to perform various security anchor and context management functions. Furthermore, AMF 344 may be a termination point of a RAN CP interface, which may include or be an N2 reference point between the RAN 504 and the AMF 344; and the AMF 344 may be a termination point of NAS (N1) signaling, and perform NAS ciphering and integrity protection. AMF 344 may also support NAS signaling with the UE 302 over an N3 IWF interface.

The SMF 346 may be responsible for SM (for example, session establishment, tunnel management between UPF 348 and AN 308); UE IP address allocation and management (including optional authorization); selection and control of UP function; configuring traffic steering at UPF 348 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 344 over N2 to AN 308; and determining SSC mode of a session. SM may refer to management of a PDU session, and a PDU session or "session" may refer to a PDU connectivity service that provides or enables the exchange of PDUs between the UE 302 and the data network 536.

The UPF 348 may act as an anchor point for intra-RAT and inter-RAT mobility, an external PDU session point of interconnect to data network 336, and a branching point to support multi-homed PDU session. The UPF 348 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 548 may include an uplink classifier to support routing traffic flows to a data network.

The NSSF 350 may select a set of network slice instances serving the UE 302. The NSSF 350 may also determine allowed NSSAI and the mapping to the subscribed S-NS-SAIs, if needed. The NSSF 350 may also determine the AMF set to be used to serve the UE 302, or a list of candidate AMFs based on a suitable configuration and possibly by querying the NRF 354. The selection of a set of network slice instances for the UE 302 may be triggered by the AMF 344 with which the UE 302 is registered by interacting with the NSSF 350, which may lead to a change of AMF. The NSSF 350 may interact with the AMF 344 via an N22 reference point; and may communicate with another NSSF in a visited network via an N31 reference point (not shown). Additionally, the NSSF 350 may exhibit an Nnssf service-based interface.

The NEF 352 may securely expose services and capabilities provided by 3GPP network functions for third party, internal exposure/re-exposure, AFs (e.g., AF 360), edge computing or fog computing systems, etc. In such embodiments, the NEF 352 may authenticate, authorize, or throttle the AFs. NEF 352 may also translate information exchanged with the AF 560 and information exchanged with internal network functions. For example, the NEF 352 may translate between an AF-Service-Identifier and an internal 5GC information. NEF 352 may also receive information from other NFs based on exposed capabilities of other NFs. This information may be stored at the NEF 352 as structured data, or at a data storage NF using standardized interfaces. The stored information can then be re-exposed by the NEF 352 to other NFs and AFs, or used for other purposes such as analytics. Additionally, the NEF 352 may exhibit an Nnef service-based interface.

The NRF 354 may support service discovery functions, receive NF discovery requests from NF instances, and provide the information of the discovered NF instances to the NF instances. NRF 354 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 354 may exhibit the Nnrf service-based interface.

The PCF 356 may provide policy rules to control plane functions to enforce them, and may also support unified policy framework to govern network behavior. The PCF 356 may also implement a front end to access subscription information relevant for policy decisions in a UDR of the UDM 358. In addition to communicating with functions over reference points as shown, the PCF 356 exhibit an Npcf service-based interface.

The UDM 358 may handle subscription-related information to support the network entities' handling of communication sessions, and may store subscription data of UE 302. For example, subscription data may be communicated via an N8 reference point between the UDM 358 and the AMF 344. The UDM 358 may include two parts, an application front end and a UDR. The UDR may store subscription data and policy data for the UDM 358 and the PCF 356, and/or structured data for exposure and application data (including PFDs for application detection, application request information for multiple UEs 302) for the NEF 352. The Nudr service-based interface may be exhibited by the UDR 321 to allow the UDM 358, PCF 356, and NEF 352 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 358 may exhibit the Nudm service-based interface.

The AF 360 may provide application influence on traffic routing, provide access to NEF, and interact with the policy framework for policy control.

In some embodiments, the 5GC 340 may enable edge computing by selecting operator/3rd party services to be geographically close to a point that the UE 302 is attached to the network. This may reduce latency and load on the network. To provide edge-computing implementations, the 5GC 340 may select a UPF 348 close to the UE 302 and execute traffic steering from the UPF 348 to data network 336 via the N6 interface. This may be based on the UE subscription data, UE location, and information provided by the AF 360. In this way, the AF 360 may influence UPF (re) selection and traffic routing. Based on operator deployment, when AF 360 is considered to be a trusted entity, the network operator may permit AF 360 to interact directly with relevant NFs. Additionally, the AF 360 may exhibit an Naf service-based interface.

The data network 336 may represent various network operator services, Internet access, or third party services that may be provided by one or more servers including, for example, application/content server 338.

The LMF 562 may receive measurement information (e.g., measurement reports) from the NG-RAN 314 and/or the UE 302 via the AMF 344. The LMF 362 may use the measurement information to determine device locations for indoor and/or outdoor positioning.

Figure 4:
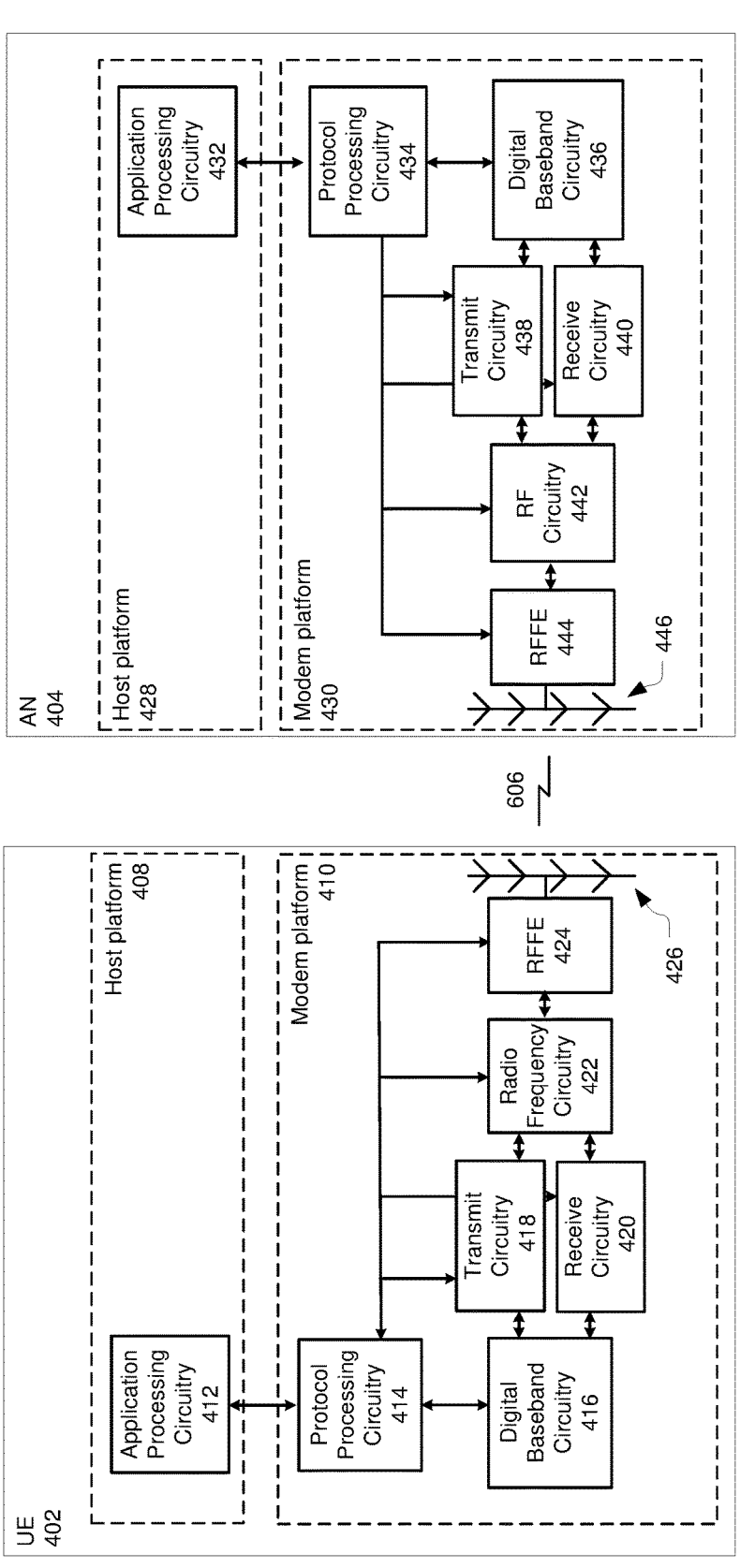
FIG. 4 schematically illustrates a wireless network, in accordance with one or more example embodiments of the present disclosure.

FIG. 4 schematically illustrates a wireless network 400, in accordance with one or more example embodiments of the present disclosure.

The wireless network 400 may include a UE 402 in wireless communication with an AN 404. The UE 402 and AN 404 may be similar to, and substantially interchangeable with, like-named components described elsewhere herein.

The UE 402 may be communicatively coupled with the AN 404 via connection 406. The connection 406 is illustrated as an air interface to enable communicative coupling, and can be consistent with cellular communications protocols such as an LTE protocol or a 5G NR protocol operating at mmWave or sub-6 GHZ frequencies.

The UE 402 may include a host platform 408 coupled with a modem platform 410. The host platform 408 may include application processing circuitry 412, which may be coupled with protocol processing circuitry 414 of the modem platform 410. The application processing circuitry 412 may run various applications for the UE 402 that source/sink application data. The application processing circuitry 412 may further implement one or more layer operations to transmit/receive application data to/from a data network. These layer operations may include transport (for example UDP) and Internet (for example, IP) operations The protocol processing circuitry 414 may implement one or more of layer operations to facilitate transmission or reception of data over the connection 406. The layer operations implemented by the protocol processing circuitry 414 may include, for example, MAC, RLC, PDCP, RRC and NAS operations.

The modem platform 410 may further include digital baseband circuitry 416 that may implement one or more layer operations that are "below" layer operations performed by the protocol processing circuitry 414 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 410 may further include transmit circuitry 618, receive circuitry 420, RF circuitry 422, and RF front end (RFFE) 424, which may include or connect to one or more antenna panels 426. Briefly, the transmit circuitry 418 may include a digital-to-analog converter, mixer, intermediate frequency (IF) components, etc.; the receive circuitry 420 may include an analog-to-digital converter, mixer, IF components, etc.; the RF circuitry 422 may include a low-noise amplifier, a power amplifier, power tracking components, etc.; RFFE 424 may include filters (for example, surface/bulk acoustic wave filters), switches, antenna tuners, beamforming components (for example, phase-array antenna components), etc. The selection and arrangement of the components of the transmit circuitry 418, receive circuitry 420, RF circuitry 422, RFFE 424, and antenna panels 426 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 414 may include one or more instances of control circuitry (not shown) to provide control functions for the transmit/receive components.

A UE reception may be established by and via the antenna panels 426, RFFE 424, RF circuitry 422, receive circuitry 420, digital baseband circuitry 416, and protocol processing circuitry 414. In some embodiments, the antenna panels 426 may receive a transmission from the AN 404 by receive-beamforming signals received by a plurality of antennas/antenna elements of the one or more antenna panels 426.

A UE transmission may be established by and via the protocol processing circuitry 414, digital baseband circuitry 416, transmit circuitry 418, RF circuitry 422, RFFE 424, and antenna panels 426. In some embodiments, the transmit components of the UE 404 may apply a spatial filter to the data to be transmitted to form a transmit beam emitted by the antenna elements of the antenna panels 426.

Similar to the UE 402, the AN 404 may include a host platform 428 coupled with a modem platform 430. The host platform 428 may include application processing circuitry 432 coupled with protocol processing circuitry 434 of the modem platform 430. The modem platform may further include digital baseband circuitry 436, transmit circuitry 438, receive circuitry 440, RF circuitry 442, RFFE circuitry 444, and antenna panels 446. The components of the AN 404 may be similar to and substantially interchangeable with like-named components of the UE 402. In addition to performing data transmission/reception as described above, the components of the AN 408 may perform various logical functions that include, for example, RNC functions such as radio bearer management, uplink and downlink dynamic radio resource management, and data packet scheduling.

Figure 5:
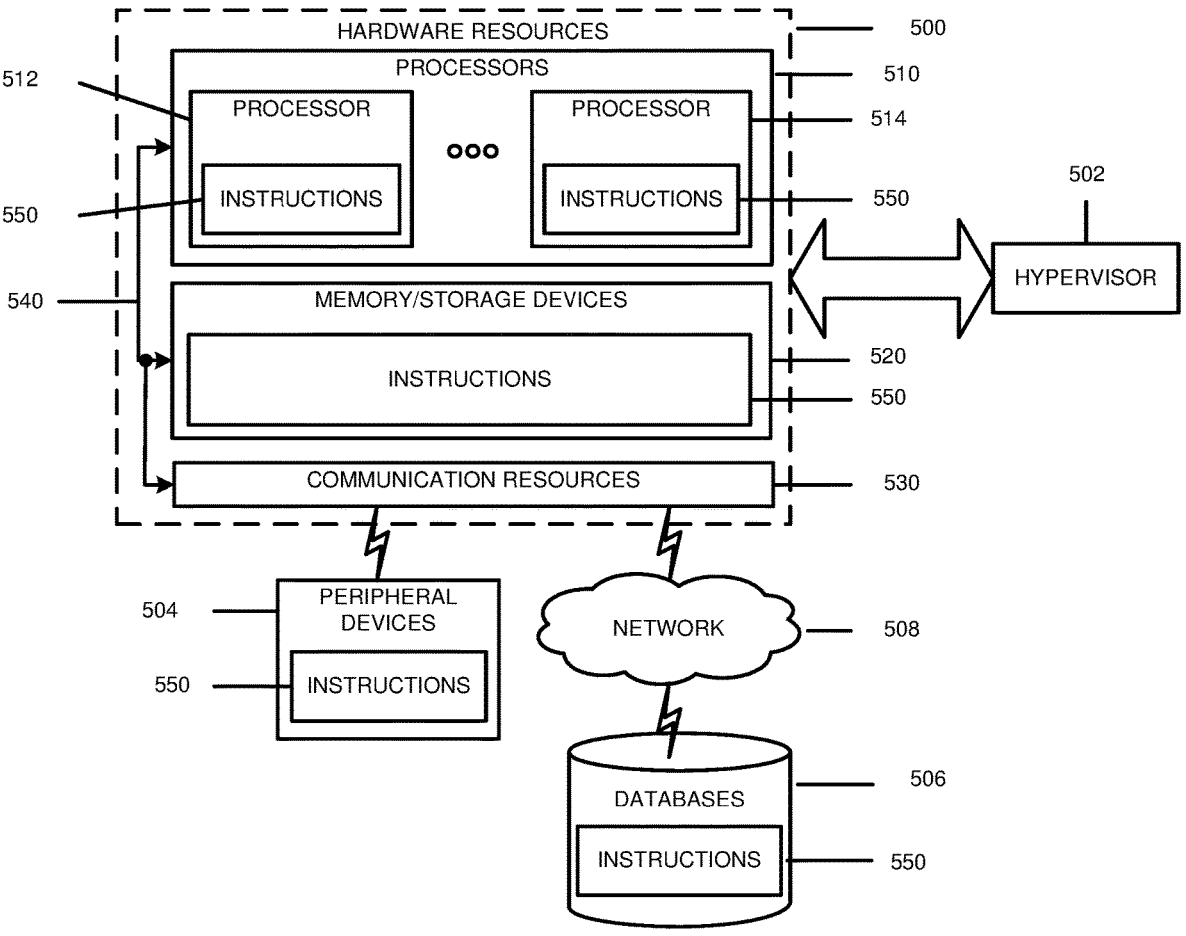
FIG. 5 is a block diagram illustrating components, in accordance with one or more example embodiments of the present disclosure.

FIG. 5 is a block diagram 500 illustrating components, in accordance with one or more example embodiments of the present disclosure.

The components may be able to read instructions from a machine-readable or computer-readable medium (e.g., a non-transitory machine-readable storage medium) and perform any one or more of the methodologies discussed herein. Specifically, FIG. 5 shows a diagrammatic representation of hardware resources including one or more processors (or processor cores) 510, one or more memory/storage devices 520, and one or more communication resources 530, each of which may be communicatively coupled via a bus 540 or other interface circuitry. For embodiments where node virtualization (e.g., NFV) is utilized, a hypervisor 502 may be executed to provide an execution environment for one or more network slices/sub-slices to utilize the hardware resources.

The processors 510 may include, for example, a processor 512 and a processor 514. The processors 510 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 520 may include main memory, disk storage, or any suitable combination thereof. The memory/storage devices 520 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 530 may include interconnection or network interface controllers, components, or other suitable devices to communicate with one or more peripheral devices 504 or one or more databases 506 or other network elements via a network 508. For example, the communication resources 530 may include wired communication components (e.g., for coupling via USB, Ethernet, etc.), cellular communication components, NFC components, Bluetooth® (or Bluetooth® Low Energy) components, Wi-Fi® components, and other communication components.

Instructions 550 may comprise software, a program, an application, an applet, an app, or other executable code for causing at least any of the processors 510 to perform any one or more of the methodologies discussed herein. The instructions 550 may reside, completely or partially, within at least one of the processors 510 (e.g., within the processor's cache memory), the memory/storage devices 520, or any suitable combination thereof. Furthermore, any portion of the instructions 550 may be transferred to the hardware resources from any combination of the peripheral devices 504 or the databases 506. Accordingly, the memory of processors 510, the memory/storage devices 520, the peripheral devices 504, and the databases 506 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Various embodiments are described below.

Example 1 may be a system of a radio access network (RAN) node B device for facilitating machine learning operations on a user equipment (UE) device, the system comprising processing circuitry coupled to storage, the processing circuitry configured to cause the node B device to transmit, to the UE device, an indication that the node B device supports machine learning; identify a service registration, received from the UE device, indicating that the UE device requests machine learning support and a machine learning model from the node B device; cause the node B device to transmit, to the UE device, a request for information associated with the UE device, the information associated with at least one of hardware capabilities or machine learning capabilities of the UE device; identify the information received from the UE device based on the request for information; cause the node B device to transmit, to the UE device, the machine learning model, a machine learning model parameter, and a machine learning configuration for use by the UE device, wherein the machine learning model, the machine learning parameter, and the machine learning configuration are based on the information; and cause the node B device to transmit, to the UE device, an update to the machine learning model, the machine learning model parameter, or the machine learning configuration for use by the UE device.

Example 2 may include the system of example 1 and/or some other example herein, wherein the machine learning model, the machine learning parameter, and the machine learning configuration are transmitted using a signaling radio bearer.

Example 3 may include the system of example 1 and/or some other example herein, wherein the machine learning model, the machine learning parameter, and the machine learning configuration are transmitted using a radio bearer dedicated to machine learning transmissions.

Example 4 may include the system of example 2 or example 3 and/or some other example herein, wherein the processing circuitry is further configured to: cause the node B device to transmit, to the UE device, a radio resource control (RRC) configuration associated with controlling a machine learning operation, using the machine learning configuration, of the UE device.

Example 5 may include the system of example 1 and/or some other example herein, wherein to set the time period further comprises to: wherein the processing circuitry is further configured to: cause the node B device to transmit, to the UE device, a policy comprising an action for the UE device to perform, the policy associated with the machine learning configuration, wherein the policy allows the UE device to select from among multiple actions based on the policy.

Example 6 may include the system of example 1 and/or some other example herein, wherein the processing circuitry is further configured to: identify a request, received from the UE, to perform an action based on results of use of the machine learning model by the UE device; and cause the node B device to transmit, to the UE device, a response based on the request, the response confirming or rejecting the action.

Example 7 may include the system of example 1 and/or some other example herein, wherein the hardware capabilities comprises an indication of whether a processor of the UE device supports machine learning, and further comprises at least one of a processor type, a maximum battery capacity, a current battery status of the UE device, or a batching data size associated with the UE device.

Example 8 may include the system of example 1 and/or some other example herein, wherein the machine learning capabilities comprise a type of machine learning model supported by the UE device, and further comprises at least one of a maximum machine learning model size, a supported library, a machine learning model training capability, or a machine learning model inference capability.

Example 9 may include the system of example 1 and/or some other example herein, wherein a RRC message comprises the machine learning configuration.

Example 10 may include the system of example 9 and/or some other example herein, wherein the RRC message further comprises a service type indicator indicating that the UE device is not required to synchronize the machine learning configuration with the node B device and that the UE device is permitted to train a machine learning model associated with an action space of the machine learning configuration.

Example 11 may include the system of example 9 and/or some other example herein, wherein the RRC message further comprises a service type indicator indicative of a service with which the machine learning configuration is associated, and indicative that the node B device trains a machine learning model associated with the machine learning configuration.

Example 12 may include the system of example 9 and/or some other example herein, wherein the RRC message further comprises a service type indicator indicating that the UE device is required to register, with the node B device, for a service associated with the machine learning configuration.

Example 13 may include the system of example 1 and/or some other example herein, wherein the processing circuitry is further configured to: identify a machine learning report, received from the UE device, the machine learning report comprising a measurement prediction associated with the machine learning configuration, performance feedback associated with the machine learning configuration, and a requested action for the UE to perform based on the performance feedback.

Example 14 may include the system of example 1 and/or some other example herein, wherein the processing circuitry is further configured to: identify a second machine learning configuration, received from the UE device, the second machine learning configuration comprising an update to the machine learning configuration.

Example 15 may include the system of example 1 and/or some other example herein, wherein the processing circuitry is further configured to: determine at least one of a machine learning model bias, a machine learning model variance, a machine learning model confidence level, or feedback associated with use of the machine learning model; generate, based on the at least one of the machine learning model bias, the machine learning model variance, the machine learning model confidence level, or the feedback, an update to the machine learning configuration for use by the UE device; and cause the node B device to transmit the update to the machine learning configuration to the UE device.

Example 16 may include the system of example 1 and/or some other example herein, wherein the processing circuitry is further configured to: identify an update request, received from the UE device, requesting an updated machine learning configuration, wherein to generate the update to the machine learning configuration is based on the update request.

Example 17 may include the system of example 1 and/or some other example herein, wherein a system information block comprises the indication that the node B device supports machine learning, and wherein the indication that the node B device supports machine learning comprises an indication of a machine learning capability and an indication of machine learning services that the node B device provides.

Example 18 may include the system of example 17 and/or some other example herein, wherein the service registration comprises a requested machine learning service of the machine learning services.

Example 19 may include the system of example 1 and/or some other example herein, wherein the machine learning configuration comprises service type of the machine learning model, a model bias threshold, a model variance threshold, an indication of whether the machine learning model is to be maintained and trained by the node B device or the UE device, and an indication of a machine learning report configuration.

Example 20 may include the system of example 19 and/or some other example herein, wherein the machine learning report configuration comprises an indication of machine learning report, report periodicity and offset, duration and start time of storage for the machine learning result.

Example 21 may include a computer-readable storage medium comprising instructions to cause processing circuitry of a radio access network (RAN) node B device, upon execution of the instructions by the processing circuitry, to: cause the node B device to transmit, to a user equipment (UE) device, an indication that the node B device supports machine learning; identify a service registration, received from the UE device, indicating that the UE device requests machine learning support and a machine learning model from the node B device; cause the node B device to transmit, to the UE device, a request for information associated with the UE device, the information associated with at least one of hardware capabilities or machine learning capabilities of the UE device; identify the information received from the UE based on the request for information; cause the node B device to transmit, to the UE device, the machine learning model, a machine learning model parameter, and a machine learning configuration for use by the UE device, wherein the machine learning model, the machine learning model parameter, and the machine learning configuration are based on the information; and cause the node B device to transmit, to the UE device, an update to the machine learning model, the machine learning model parameter, or the machine learning configuration for use by the UE device.

Example 22 may include the computer-readable medium of example 21 and/or some other example herein, wherein the machine learning model, the machine learning model parameter, and the machine learning configuration are transmitted using a radio bearer dedicated to machine learning transmissions.

Example 23 may include a method for facilitating machine learning operations on a user equipment (UE) device, the method comprising: causing, by processing circuitry of a radio access network (RAN) node B device, the node B device to transmit, to the UE device, an indication that the node B device supports machine learning; identifying, by the processing circuitry, a service registration, received from the UE device, indicating that the UE device requests machine learning support and a machine learning model from the node B device; causing, by the processing circuitry, the node B device to transmit, to the UE device, a request for information associated with the UE device, the information associated with at least one of hardware capabilities or machine learning capabilities of the UE device; identifying, by the processing circuitry, the information received from the UE based on the request for information; causing, by the processing circuitry, the node B device to transmit, to the UE device, the machine learning model, a machine learning model parameter, and a machine learning configuration for use by the UE device, wherein the machine learning model, the machine learning model parameter, and the machine learning configuration are based on the information; and causing, by the processing circuitry, the node B device to transmit, to the UE device, an update to the machine learning model, the machine learning model parameter, or the machine learning configuration for use by the UE device.

Example 24 may include an apparatus comprising means for: causing a node B device to transmit, to the UE device, an indication that the node B device supports machine learning; identifying a service registration, received from the UE device, indicating that the UE device requests machine learning support and a machine learning model from the node B device; causing the node B device to transmit, to the UE device, a request for information associated with the UE device, the information associated with at least one of hardware capabilities or machine learning capabilities of the UE device; identifying the information received from the UE based on the request for information; causing the node B device to transmit, to the UE device, the machine learning model, a machine learning model parameter, and a machine learning configuration for use by the UE device, wherein the machine learning model, the machine learning model parameter, and the machine learning configuration are based on the information; and causing the node B device to transmit, to the UE device, an update to the machine learning model, the machine learning model parameter, or the machine learning configuration for use by the UE device.

Example 25 may include one or more non-transitory computer-readable media comprising instructions to cause an electronic device, upon execution of the instructions by one or more processors of the electronic device, to perform one or more elements of a method described in or related to any of examples 1-24, or any other method or process described herein Example 26 may include an apparatus comprising logic, modules, and/or circuitry to perform one or more elements of a method described in or related to any of examples 1-24, or any other method or process described herein.

Example 27 may include a method, technique, or process as described in or related to any of examples 1-24, or portions or parts thereof.

Example 28 may include an apparatus comprising: one or more processors and one or more computer readable media comprising instructions that, when executed by the one or more processors, cause the one or more processors to perform the method, techniques, or process as described in or related to any of examples 1-24, or portions thereof.

Example 29 may include a method of communicating in a wireless network as shown and described herein.

Example 30 may include a system for providing wireless communication as shown and described herein.

Example 31 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators.

The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

Unless used differently herein, terms, definitions, and abbreviations may be consistent with terms, definitions, and abbreviations defined in 3GPP TR 21.905 v16.0.0 (2019-06) and/or any other 3GPP standard. For the purposes of the present document, the following abbreviations (shown in Table 4) may apply to the examples and embodiments discussed herein.

TABLE 4

| Abbreviations: | |
| --- | --- |
| 3GPP | Third Generation Partnership Project |
| 4G | Fourth Generation |
| 5G | Fifth Generation |
| 5GC | 5G Core network |
| AC | Application Client |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AP | Application Protocol, Antenna Port, Access Point |

TABLE 4-continued

Abbreviations:

| | |
|---|---|
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CFRA | Contention Free Random Access |
| CG | Cell Group |
| CGF | Charging Gateway Function |
| CHF | Charging Function |
| CI | Cell Identity |
| CID | Cell-ID (e g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTF | Charging Trigger Function |
| CTS | Clear-to-Send |
| CW | Codeword |
| CWS | Contention Window Size |

TABLE 4-continued

Abbreviations:

| | |
|---|---|
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |

TABLE 4-continued

| Abbreviations: | |
|---|---|
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-U | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN |

TABLE 4-continued

| Abbreviations: | |
|---|---|
| | Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-I | MAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |

TABLE 4-continued

Abbreviations:

| | |
|---|---|
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |

TABLE 4-continued

Abbreviations:

| | |
|---|---|
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |

TABLE 4-continued

Abbreviations:

| | |
|---|---|
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH | Block |
| SSBRI | SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |

TABLE 4-continued

Abbreviations:

| | |
|---|---|
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastructure |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, VLAN Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |

47

TABLE 4-continued

| | Abbreviations: |
|---|---|
| XRES | EXpected user RESponse |
| XOR | eXclusive OR |
| ZC | Zadoff-Chu |
| ZP | Zero Power |

What is claimed is:

1. A system of a radio access network (RAN) node B device for facilitating machine learning operations on a user equipment (UE) device, the system comprising processing circuitry coupled to storage, the processing circuitry configured to:

cause the node B device to transmit, to the UE device, an indication that the node B device supports machine learning, wherein the indication that the node B device supports machine learning comprises an indication of machine learning services that the node B device provides;

identify a service registration, received from the UE device, indicating that the UE device requests machine learning support and a machine learning model from the node B device, wherein the service registration comprises a requested machine learning service of the machine learning services;

cause the node B device to transmit, to the UE device, a request for information associated with the UE device, the information associated with at least one of hardware capabilities or machine learning capabilities of the UE device;

identify the information received from the UE device based on the request for information;

cause the node B device to transmit, to the UE device, the machine learning model, a machine learning model parameter, and a machine learning configuration for use by the UE device, wherein the machine learning model, the machine learning parameter, and the machine learning configuration are based on the information; and cause the node B device to transmit, to the UE device, an update to the machine learning model, the machine learning model parameter, or the machine learning configuration for use by the UE device.

2. The system of claim 1, wherein the machine learning model, the machine learning parameter, and the machine learning configuration are transmitted using a signaling radio bearer.

3. The system of claim 1, wherein the machine learning model, the machine learning parameter, and the machine learning configuration are transmitted using a radio bearer dedicated to machine learning transmissions.

4. The system of claim 2, wherein the processing circuitry is further configured to:

cause the node B device to transmit, to the UE device, a radio resource control (RRC) configuration associated with controlling a machine learning operation, using the machine learning configuration, of the UE device.

5. The system of claim 1, wherein the processing circuitry is further configured to:

cause the node B device to transmit, to the UE device, a policy comprising an action for the UE device to perform, the policy associated with the machine learning configuration, wherein the policy allows the UE device to select from among multiple actions based on the policy.

6. The system of claim 1, wherein the processing circuitry is further configured to:

identify a request, received from the UE, to perform an action based on results of use of the machine learning model by the UE device; and cause the node B device to transmit, to the UE device, a response based on the request, the response confirming or rejecting the action.

7. The system of claim 1, wherein the hardware capabilities comprises an indication of whether a processor of the UE device supports machine learning, and further comprises at least one of a processor type, a maximum battery capacity, a current battery status of the UE device, or a batching data size associated with the UE device.

8. The system of claim 1, wherein the machine learning capabilities comprise a type of machine learning model supported by the UE device, and further comprises at least one of a maximum machine learning model size, a supported library, a machine learning model training capability, or a machine learning model inference capability.

9. The system of claim 1, wherein a RRC message comprises the machine learning configuration.

10. The system of claim 9, wherein the RRC message further comprises a service type indicator indicating that the UE device is not required to synchronize the machine learning configuration with the node B device and that the UE device is permitted to train a machine learning model associated with an action space of the machine learning configuration.

11. The system of claim 9, wherein the RRC message further comprises a service type indicator indicative of a service with which the machine learning configuration is associated, and indicative that the node B device trains a machine learning model associated with the machine learning configuration.

12. The system of claim 9, wherein the RRC message further comprises a service type indicator indicating that the UE device is required to register, with the node B device, for a service associated with the machine learning configuration.

13. The system of claim 1, wherein the processing circuitry is further configured to:

identify a machine learning report, received from the UE device, the machine learning report comprising a measurement prediction associated with the machine learning configuration, performance feedback associated with the machine learning configuration, and a requested action for the UE to perform based on the performance feedback.

14. The system of claim 1, wherein the processing circuitry is further configured to:

identify a second machine learning configuration, received from the UE device, the second machine learning configuration comprising an update to the machine learning configuration.

15. The system of claim 1, wherein the processing circuitry is further configured to:

determine at least one of a machine learning model bias, a machine learning model variance, a machine learning model confidence level, or feedback associated with use of the machine learning model;

generate, based on the at least one of the machine learning model bias, the machine learning model variance, the machine learning model confidence level, or the feedback, an update to the machine learning configuration for use by the UE device; and cause the node B device to transmit the update to the machine learning configuration to the UE device.

16. The system of claim 15, wherein the processing circuitry is further configured to:

identify an update request, received from the UE device, requesting an updated machine learning configuration, wherein to generate the update to the machine learning configuration is based on the update request.

17. The system of claim 1, wherein a system information block comprises the indication that the node B device supports machine learning, and wherein the indication that the node B device supports machine learning comprises an indication of a machine learning capability and an indication of machine learning services that the node B device provides.

18. A non-transitory computer-readable storage medium comprising instructions to cause processing circuitry of a radio access network (RAN) node B device, upon execution of the instructions by the processing circuitry, to:

cause the node B device to transmit, to a user equipment (UE) device, an indication that the node B device supports machine learning, wherein the indication that the node B device supports machine learning comprises an indication of machine learning services that the node B device provides;

identify a service registration, received from the UE device, indicating that the UE device requests machine learning support and a machine learning model from the node B device, wherein the service registration comprises a requested machine learning service of the machine learning services;

cause the node B device to transmit, to the UE device, a request for information associated with the UE device, the information associated with at least one of hardware capabilities or machine learning capabilities of the UE device;

identify the information received from the UE based on the request for information;

cause the node B device to transmit, to the UE device, the machine learning model, a machine learning model parameter, and a machine learning configuration for use by the UE device, wherein the machine learning model, the machine learning model parameter, and the machine learning configuration are based on the information; and cause the node B device to transmit, to the UE device, an update to the machine learning model, the machine learning model parameter, or the machine learning configuration for use by the UE device.

19. The non-transitory computer-readable storage medium of claim 18, wherein the machine learning model, the machine learning model parameter, and the machine learning configuration are transmitted using a radio bearer dedicated to machine learning transmissions.

20. A method for facilitating machine learning operations on a user equipment (UE) device, the method comprising:

causing, by processing circuitry of a radio access network (RAN) node B device, the node B device to transmit, to the UE device, an indication that the node B device supports machine learning, wherein the indication that the node B device supports machine learning comprises an indication of machine learning services that the node B device provides;

identifying, by the processing circuitry, a service registration, received from the UE device, indicating that the UE device requests machine learning support and a machine learning model from the node B device, wherein the service registration comprises a requested machine learning service of the machine learning services;

causing, by the processing circuitry, the node B device to transmit, to the UE device, a request for information associated with the UE device, the information associated with at least one of hardware capabilities or machine learning capabilities of the UE device;

identifying, by the processing circuitry, the information received from the UE based on the request for information;

causing, by the processing circuitry, the node B device to transmit, to the UE device, the machine learning model, a machine learning model parameter, and a machine learning configuration for use by the UE device, wherein the machine learning model, the machine learning model parameter, and the machine learning configuration are based on the information; and causing, by the processing circuitry, the node B device to transmit, to the UE device, an update to the machine learning model, the machine learning model parameter, or the machine learning configuration for use by the UE device.

* * * * *